United States Patent [19]

Iwamoto et al.

[11] 4,045,526
[45] Aug. 30, 1977

[54] PROCESS FOR THE PREPARATION OF GRAPHITE-CLAD NUCLEAR FUEL RODS

[75] Inventors: Kazumi Iwamoto, Naka; Tutomu Tobita, Katsuta; Toshio Masuyama; Hiroshi Yamazoe, both of Yokohama, all of Japan

[73] Assignees: Nippon Carbon Co., Ltd.; Japan Atomic Energy Research Institute, both of Tokyo, Japan

[21] Appl. No.: 559,298

[22] Filed: Mar. 17, 1975

[30] Foreign Application Priority Data

Mar. 22, 1974 Japan ................. 49-31552

[51] Int. Cl.² .............. G21C 21/02; G21C 21/16
[52] U.S. Cl. ............................ 264/05; 176/89
[58] Field of Search .................. 264/.5; 176/89

[56] References Cited

U.S. PATENT DOCUMENTS

| | | | |
|---|---|---|---|
| 3,158,547 | 11/1964 | Smith | 264/.5 |
| 3,166,614 | 1/1965 | Taylor | 264/.5 |
| 3,558,750 | 1/1971 | Davis et al. | 264/.5 |
| 3,900,358 | 8/1975 | Bujas et al. | 176/82 |
| 3,912,798 | 10/1975 | Rachor et al. | 264/.5 |

*Primary Examiner*—Leland A. Sebastian
*Attorney, Agent, or Firm*—Frank J. Jordan

[57] ABSTRACT

A process for the preparation of graphite-clad nuclear fuel rods comprising coating fine particles of a nuclear fuel such as uranium oxide or thorium oxide with a matrix material containing graphite powder and a binder to form matrix material-coated globules, charging the thus-formed globules, without or after being pre-molded into a green rod-like fuel compact, into the rubber mold of a rubber press molding machine, charging a similar matrix material in the gap between the globules or rod-like fuel compact and the inner wall of the rubber mold, compressing the whole mass in the direction from the side face of the whole mass to the axis thereof to form a green, graphite coat material-coated fuel compact, baking the thus-formed green fuel compact at a temperature of up to 1800° C and, if desired, impregnating the baked product with a resin followed by being rebaked at a temperature of up to 1800° C; and the graphite-clad nuclear fuel rods.

10 Claims, 12 Drawing Figures

PREPARATION OF GRAPHITE - COATED NUCLEAR FUEL RODS

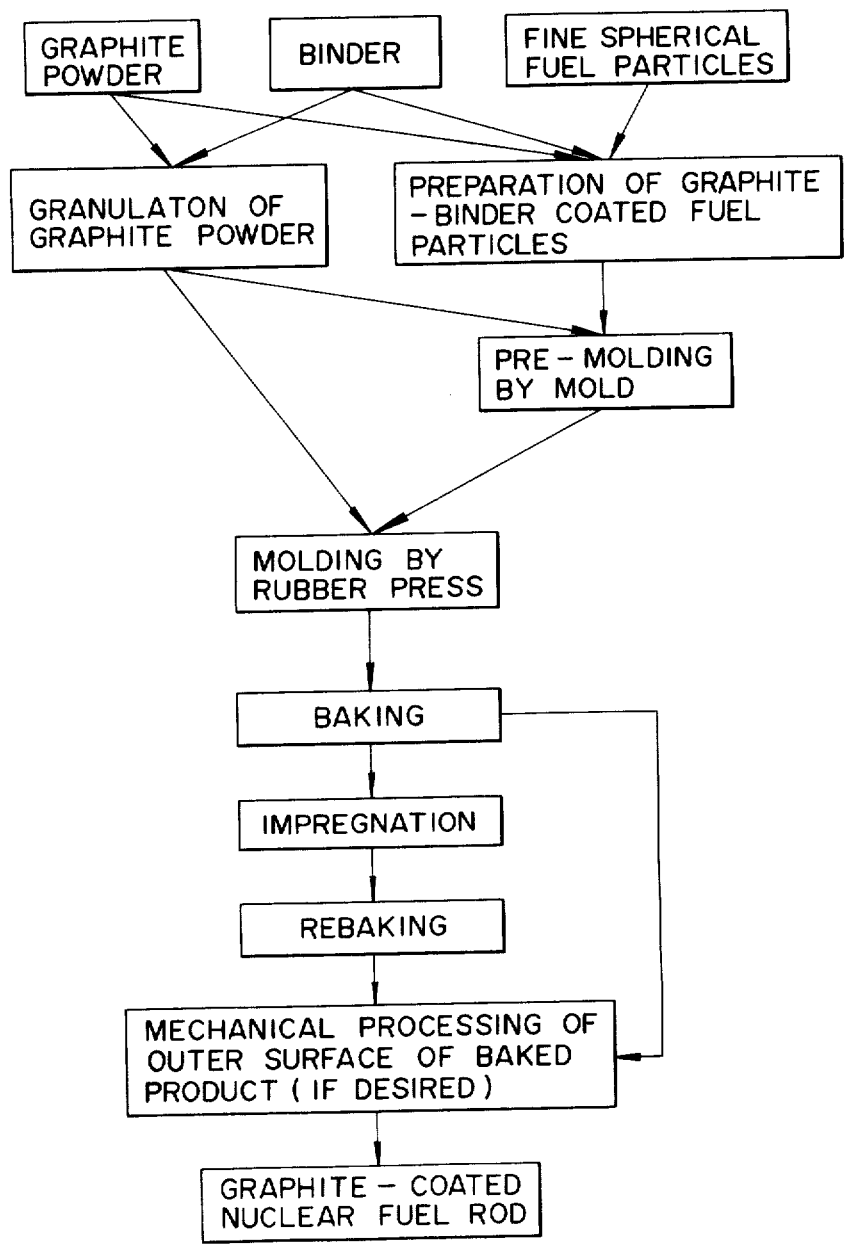

PROCESS FOR THE PREPARATION OF GRAPHITE-CLAD NUCLEAR FUEL RODS

This invention relates to a process for the preparation of graphite-clad or graphite-coated nuclear fuel rods. More particularly, the invention relates to a process for the preparation of excellent integrated graphite-coated nuclear fuel rods for high temperature gas-cooled reactors, the graphite-coated rods being prepared by integrally molding a material for the nuclear fuel rod and a material for the graphite coat or sheath for the nuclear fuel rod and baking the integrally molded mass Conventional rod-type, for example, cylindrically-shaped nuclear fuel compacts or rods, comprising coated particulate nuclear fuel, have heretofore been prepared by charging a mixture of the coated nuclear fuel particles, graphite powder and a binder therefor into a metallic molding die, compressing the mixture in its axial direction to obtain a molding thereof and baking the molding. Such conventional methods are impossible to thereby prepare fuel rods which are very large in length as compared with their diameter; moreover, these rods when each housed in a graphite sleeve for use in atomic reactors will constitute resistance to heat transfer in gaps between the rods and sleeves, and they will therefore be caused to be heated to excessively high temperatures when in use.

This invention eliminates such drawbacks. The graphite-sheathed nuclear fuel rods, which are final products, of this invention consist essentially of a nuclear fuel rod and a graphite sheath (or coat) therefor which have been integrated by the use of specific integrally molding and subsequently baking techniques according to this invention. The integration of the fuel rod and graphite sheath in the final product of this invention when using the final product in the reactor, will be conducive to ensuring a decreased heat resistance at the portion between the rod and sheath and also to ensuring a less difference in irradiation shrinkability between the rod and sheath thereby preventing them from peeling from each other with the result that the final products have satisfactory heat characteristics and a high capability of specific heat dissipation.

The integral structure of the final products of this invention gives the advantages and effects as detailed below.

It enables the final products not only to exchange heat directly with a cooling gas when they are used but also to obtain high densification thereon whereby they have an increased strength and heat conductivity.

It also enables the final products to be mechanically processed safely without exposing the nuclear fuel particles of the rod because the rod is covered with the graphite coat, that is the graphite-clad one.

This invention will now be illustrated in detail by reference to the accompanying drawings, in which:

FIG. 1 is a flow sheet illustrating the steps of the process of this invention using a rubber press;

Figure 3A:
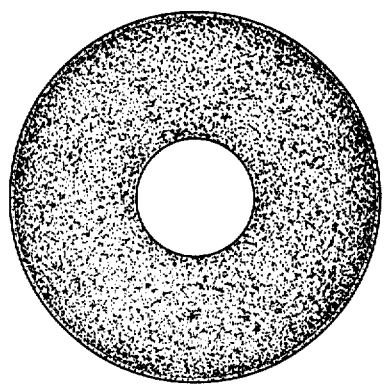
Figure 3B:
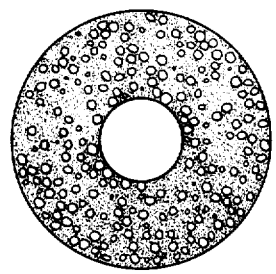
Figure 3C:
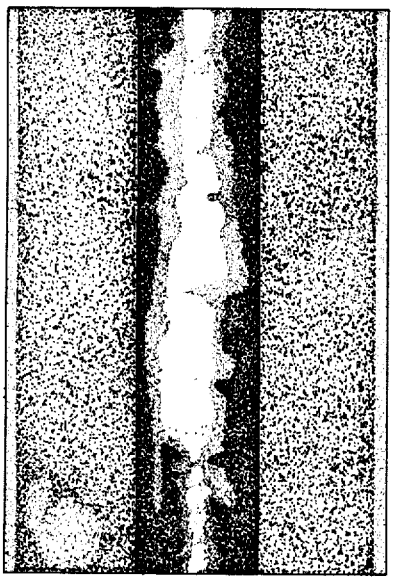
Figure 4A:
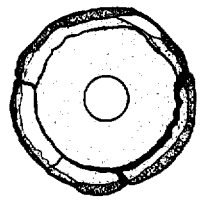
Figure 4B:
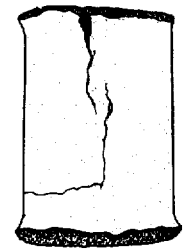
Figure 5:
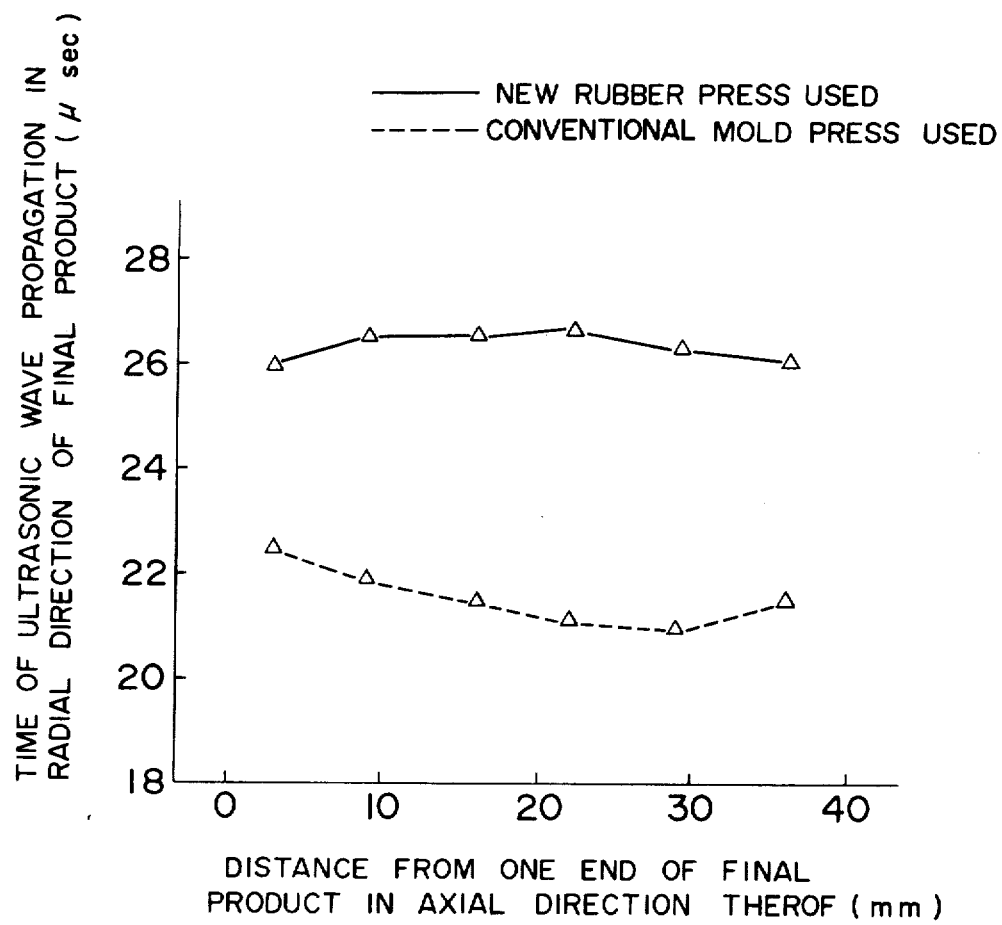

FIG. 3(A) is a cross-sectional view of a final product of this invention containing nuclear fuel particles having an average particle size of 300 $\mu$, FIG. 3(C) a longitudinally-sectional view of the final product of FIG. 3(A) and FIG. 3(B) a cross-sectional view of a final product simulating the final product of this invention and containing, in lieu of nuclear fuel particles, alumina particles having an average particle size of 800 $\mu$;

FIG. 4(A) is a view illustrating the state of one end surface of a comparative final product prepared according to the conventional molding method and FIG. 4(B) a view illustrating the state of the side surface of the comparative product; and FIG. 5 shows graphs indicating ultrasonic wave propagation speeds in the radial direction measured on the final product of this invention of FIG. 3(B) and the comparative one prepared according to the conventional molding method.

A graphite-coated nuclear fuel rod having an integrated structure according to this invention is prepared by a process as shown in the flow sheet of FIG. 1. Fine spherical particles (having an average particle size of from 100 to 1000 $\mu$) of an oxide of uranium, thorium, plutonium or the like with thereon a coating of pyrolytic carbon and/or a coating of silicon carbide are coated with a matrix material formed by mixing graphite powder (having a size not exceeding 74 $\mu$) and a binder (composed mainly of a thermosetting resin such as a phenolic resin, furan resin and divinylbenzene resin, or of tar, pitch or the like and, if desired, including water or an organic solvent such as methanol, acetone or benzene) in a mixing ratio by weight of from 100 : 10 to 60, preferably from 100 : 20 to 35, and the resulting coated globules or matrix material-coated particles are semi-dried according to need. These coated globules are filled in a usual mold and pre-molded under a compression pressure of from 30 to 200 Kg/cm² to thereby form a green, tubular or rod-like fuel compact, namely a green compressed body. It is preferred that in the thus-obtained green fuel compact the ratio of diameter : length be not higher than 1 : 2. One such green fuel compact or two or more of such green fuel compacts in stacked relation are charged into the rubber mold of a rubber press molding machine and thereafter a powdery, granular or pasty matrix material that is a graphite sheath material, formed by mixing graphite powder with the binder is filled in the gap between the green fuel compact or compacts and the rubber mold. Then, compression molding is carried out under a compression pressure of from 100 to 2000 Kg/cm² exerted on the side face of the whole mass in the rubber mold in the radial direction of the whole mass towards the axis thereof by means of the rubber press, to thereby obtain a green integrated graphite-coated nuclear fuel compact. In order to prevent cracks or the like from occurring in the integral molded product due to shrinkage of the binder in the subsequent firing step, it is necessary to adjust the binder content in both the green fuel compact portion (inside) and the graphite sheath material portion (outside). It is preferred that the amount of the binder used be from 20 to 35 parts by weight per 100 parts by weight of the graphite powder in the green fuel compact portion and 15 to 20 parts by weight per 100 parts by weight of the graphite powder in the graphite sheath (or coat) material portion. Such a green, integrated graphite-coated nuclear fuel compact may alternatively be obtained by molding in a usual mold the mixture of the graphite and binder into a pipe-like or sheath-like shape having such a size that it can be housed in the rubber mold of the rubber press molding machine, charging the thus-molded sheath-like shape into the rubber mold, inserting into the sheath-like shape the coated globules or inserting thereinto in stacked relation a desired number of green rod-like fuel compacts depending upon the length thereof, the green fuel compacts being prepared by pre-molding the coated globules under the compression pressure in a usual mold, and then molding the whole mass in the rubber mold under the compression pressure exerted in the same direction as mentioned above by the use of the rubber press molding machine, to thereby obtain the green, integrated graphite-coated nuclear fuel compact. The green integral product is baked at a temperature of from about 700° to about 1800° C., preferably not lower than about 1400° C. If necessary, the resulting baked product is impregnated with a resin or the like and then subjected to rebaking. The baked or rebaked product so obtained is subjected to the mechanical processing of the outer surface thereof if desired. There is thus obtained a final product of this invention. It has been found that preferred final products should contain nuclear fuel particles in amounts by volume of from 15 to 45%, preferably from 20 to 40%, in their fuel compact portion and should be from about 0.3 to about 15 mm in thickness in their graphite sheath portion.

This invention will now be described in detail by reference to the following Example.

EXAMPLE

In this Example there was employed, as the finely particulate nuclear fuel, a sample (A) composed of uranium dioxide ($UO_2$) particles of an average particle size of about 300 $\mu$ coated with pyrolytic carbon; for comparison, there was also employed, as the particles simulating particulate nuclear fuel, a sample (B) composed of almina particles of a particle size of about 800 $\mu$ coated with pyrolytic carbon. In the preparation of a matrix material used herein there were used artificial graphite powder of an average particle size of 10 $\mu$ and a phenolic resin binder. The intended dimension of the resulting final products was 24 mm (outer diameter) × 8 mm (inner diameter) × 40 mm (length).

In FIG. 2, referential numerals 1, 2, 3 and 4 denote graphite-binder coated globules, a matrix material, a pre-molded green fuel compact portion and a graphite core, respectively. Referential numerals 5 and 6 denote a metal mold portion and rubber mold portion of a rubber press, respectively. Referential numerals 5' and 6' denote male and female molds or dies of a pre-molding machine. Referential numeral 7 indicates a matrix material-coated fuel compact obtained by molding by the use of the rubber press.

Figure 2A:
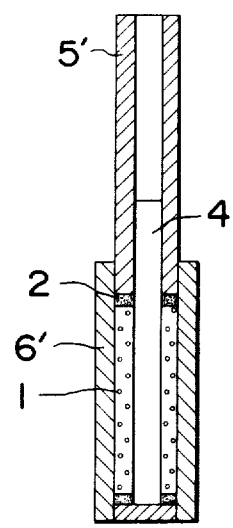
FIG. 2(a) shows the preparation of a pre-molded fuel compact in a mold.
Figure 2B:
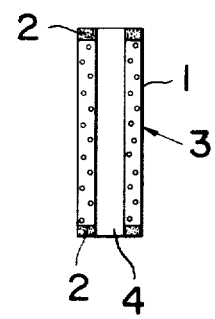
FIG. 2(b) shows the premolded product taken out of the mold of FIG. 2(a)
Figure 2C:
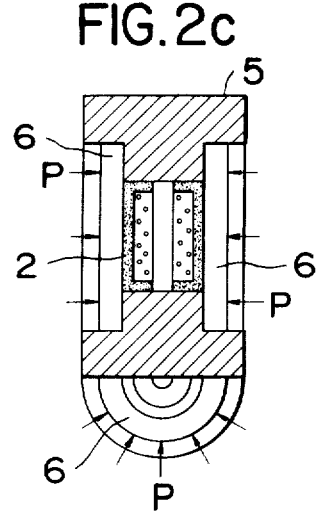
FIG. 2(c) shows a rubber press molding machine which is compressing the mold of FIG. 2(b) and FIG. 2(d) shows a green, matrix material-coated fuel compact molded by the rubber press molding machine.

The above-mentioned artificial graphite powder (having a maximum particle size not exceeding 30 $\mu$) and the binder (phenolic resin) were mixed in ratios by weight of 100 : 25 to prepare the matrix material. The above-mentioned particles of samples (A) and (B) were coated with the thus-prepared matrix material, and the resulting coated globules 1 [having an average diameter of about 500 $\mu$ in the case of sample (A) and about 1640 $\mu$ in the case of sample (B)] were pre-molded around the graphite core 4 under a compression pressure of 50 Kg/cm² in a mold as shown in FIG. 2(a) to prepare a pre-molded green fuel compact portion 3 as shown in FIG. 2(b). The pre-molded green compact portion 3 was charged in the rubber mold 6 of the rubber press molding machine as shown in FIG. 2(c) and the matrix material 2 formed by mixing artificial graphite powder (having a maximum particle size not exceeding 30 $\mu$) and the phenolic resin in a ratio by weight of 100 : 20 was charged around the periphery of the compact portion 3. Then, compression molding was performed on the whole mass so charged in the rubber mold 6 by pressing the side face of said whole mass towards the axis of the whole mass in the radial direction thereof by the rubber mold under an oil pressure of 200 Kg/cm². Then, the pressure was released and the graphite core was removed, and the green molded product was baked at 1800° C. If desired, a part of the molded products so baked was impregnated with a phenolic resin or the like and rebaked at 1800° C. The matrix portion around the fuel compact portion, namely the graphite sheath portion, of the baked products so obtained was mechanically processed as desired. In such manner, desired final products are obtained.

For comparison with the final products prepared by the process of this invention using the rubber press, there were prepared conventional ones by a conventional process using a known metal press.

The results will be described below.

Figure 2D:
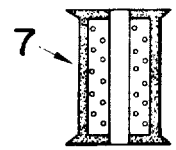

In the rubber press-molded mass as is shown in FIG. 2(d), the thickness of the wall was substantially uniform, although outward projections were formed on the sheath material portion around each wall end. FIGS. 3(A) and 3(B) illustrate examples of the final products obtained according to the process of this invention. In one final product shown in FIG. 3(A), the nuclear fuel particles were packed in an amount by volume of 40% and the sheath portion had a substantially uniform thickness of about 0.47 mm, and in the other shown in FIG. 3(B), the alumina particles were packed in an amount by volume of 20% and the sheath portion had a substantially uniform thickness of about 0.47 mm. In mechanically processing the final products prepared according to this invention, the sheath portion was never peeled from the fuel compact portion. The final products had a matrix density of 1.70 g/cm³ when they were those prepared without the resin impregnation and 1.72 g/cm³ when they were those subjected even to the resin impregnation. In contrast, comparative final products prepared in the same manner as in the invention except that the conventional molding technique was substituted for the rubber press molding one, had a matrix density of 1.57 g/cm³ without the resin impregnation conducted in the process and 1.70 g/cm³ when the resin impregnation was included in the process. As is shown in FIG. 4, since uniform compression had not been attained on the to-be-molded masses from the side face thereof by the use of the conventional molding method in substitution for the rubber press molding method, there were many of the molded masses which allowed their sheath material portion to peel from their fuel rod material portion in the baking step. From the foregoing results, it will readily be understood that in order to obtain a higher density on the final products, it is preferred to include in the process not only the resin impregnation step but also the uniform pressure molding step using such a rubber press as used in the process of this invention. Further, from FIG. 3, it is seen that in the final products prepared according to the process of this invention, the fine particles are uniformly dispersed and the graphite sheath is in perfectly satisfactory condition. In order to confirm the structural uniformity in the novel and conventional final products, the ultrasonic wave propagation speed in the radial direction of the final products was measured with respect to each of the predetermined several points in the axial direction of the final product, to obtain the results shown in FIG. 5. Thus, it was confirmed that the structural uniformity was attained in the final products molded by using the rubber press but not in the final product prepared by the customary molding method using the conventional metal mold.

What is claimed is:

1. A process for the preparation of tubular crack-free graphite-coated nuclear fuel compacts which comprises the steps of:
    coating fine particles of a nuclear fuel with a matrix material formed by mixing 100 parts by weight of graphite powder with 20 to 35 parts by weight of a binder, to form matrix material-coated globules,
    pre-molding the thus coated globules in a tube forming pre-molding machine to obtain a tubular fuel compact,
    charging the thus obtained tubular fuel compact into the rubber mold of a rubber press molding machine,
    filling a matrix material formed by mixing 100 parts by weight of graphite powder with 15 – 20 parts by weight of a binder, around the tubular fuel compact in the rubber mold,
    conducting compression molding by compressing the side face of the thus obtained whole mass towards the axis of the whole mass in the radial direction thereof by means of the rubber press, to form a green, matrix material-coated fuel compact,
    baking the thus formed green matrix material-coated compact at a temperature of up to 1800° C to thereby prepare the tubular crack-free graphite-coated nuclear fuel compacts, and if desired,
    impregnating the thus prepared product with a resin and subjecting the impregnated product to rebaking at a temperature of up to 1800° C for further densification thereof.

2. A process for the preparation of tubular crack-free graphite-coated nuclear fuel compacts according to claim 1, wherein the particles of the nuclear fuel have an average particle size of from 100 to 1000 $\mu$ and the graphite powder has a particle size not exceeding 74 $\mu$.

3. A process for the preparation of tubular crack-free graphite-coated nuclear fuel compacts according to claim 1, wherein the binder is a thermosetting resin.

4. A process for the preparation of tubular crack-free graphite-coated nuclear fuel compacts according to claim 1, wherein the pre-molding is conducted under a compression pressure of from 30 to 200 Kg/cm$^2$.

5. A process for the preparation of tubular crack-free graphite-coated nuclear fuel compacts according to claim 1, wherein the rubber press molding is conducted under a compression pressure of from 100 to 2000 Kg/cm$^2$.

6. A process for the preparation of tubular crack-free graphite-coated nuclear fuel compacts according to claim 1, wherein the baking is conducted at a temperature of from 700° to 1800° C.

7. A process for the preparation of tubular crack-free graphite-coated nuclear fuel compacts according to claim 1, wherein the fuel compact portion of the graphite-clad nuclear fuel rod contains 15 to 45% by volume of the nuclear fuel fine particles and the graphite coat portion has a thickness of from 0.3 to 15 mm.

8. A process for the preparation of tubular crack-free graphite-coated nuclear fuel compacts according to claim 1, wherein the fuel compact portion contains 20 to 40% by volume of the nuclear fuel fine particles and the graphite coat portion has a thickness of from 0.3 to 15 mm.

9. Tubular crack-free graphite-coated nuclear fuel compacts prepared by the process of claim 1.

10. Tubular crack-free graphite-coated nuclear fuel compacts prepared by the process of claim 7.

* * * * *